(12) United States Patent
Penfold et al.

(10) Patent No.: US 11,584,334 B2
(45) Date of Patent: Feb. 21, 2023

(54) VEHICLE OCCUPANT RESTRAINT

(71) Applicant: APV CORPORATION PTY LTD, Campbellfield (AU)

(72) Inventors: Harrison Luke Penfold, Campbellfield (AU); Cameron Scott Hickling, Campbellfield (AU); Harry Charles William Hickling, Campbellfield (AU); Christopher Thomas Sweetman, Campbellfield (AU); Douglas Lewis Moss Keesing, Campbellfield (AU)

(73) Assignee: APV CORPORATION PTY LTD, Campbellfield (AU)

( * ) Notice: Subject to any disclaimer, the term of this patent is extended or adjusted under 35 U.S.C. 154(b) by 0 days.

(21) Appl. No.: 17/230,304

(22) Filed: Apr. 14, 2021

(65) Prior Publication Data

US 2022/0048463 A1 Feb. 17, 2022

(30) Foreign Application Priority Data

Aug. 14, 2020 (AU) .................................. 2020902886

(51) Int. Cl.
*B60R 22/26* (2006.01)
*B60R 22/20* (2006.01)

(52) U.S. Cl.
CPC .............. *B60R 22/26* (2013.01); *B60R 22/20* (2013.01)

(58) Field of Classification Search
CPC ................................. B60R 22/20; B60R 22/26
See application file for complete search history.

(56) References Cited

U.S. PATENT DOCUMENTS

| | | | | |
|---|---|---|---|---|
| 4,120,531 A | * | 10/1978 | Fefferman | ............... B60N 2/143 297/344.22 |
| 4,919,488 A | * | 4/1990 | Deegener | ................ B60R 22/26 297/468 |
| 6,485,058 B1 | * | 11/2002 | Kohlndorfer | ........... B60R 22/03 280/808 |

* cited by examiner

*Primary Examiner* — Barry Gooden, Jr.
(74) *Attorney, Agent, or Firm* — Quarles & Brady LLP

(57) ABSTRACT

A vehicle occupant restraint system for a seat of a vehicle. The system includes a first arm portion mountable on a first side of the seat, the first arm having an engaging portion; and a second arm portion mountable on a second side of the seat, the second arm having an engaging portion, the engaging portion of the first arm portion being engageable with the engaging portion of the second arm portion to restrain an occupant on the seat. At least one of the first arm portion and the second arm portion is adjustable relative to the seat.

11 Claims, 4 Drawing Sheets

VEHICLE OCCUPANT RESTRAINT

CROSS-REFERENCE TO RELATED APPLICATIONS

This application claims the benefit of priority to Australian Patent Application No. 2020902886, filed Aug. 14, 2020.

FIELD OF THE INVENTION

The invention relates to a vehicle occupant restraint.

BACKGROUND

An example of an existing vehicle occupant restraint system for ensuring that an occupant uses the restraints includes a seatbelt tongue on an elongate flap extending from the seat that normally obstructs entry into the seat. This existing system requires the occupant to move the flap out of the way before the occupant can sit down on the seat. Once the occupant occupies the seat, the occupant can then reposition the flap across their waist and fasten the seatbelt tongue on the flap into the seatbelt buckle. This existing system is intended to force the occupant to use the restraint by locating components of the restraint system in the way of the occupant (i.e., by obstructing the seat). The nature of this restraint system makes it cumbersome to use by the occupant.

In this context, there is a need for improved vehicle occupant restraint.

SUMMARY OF THE INVENTION

According to an aspect of the present invention, there is provided a vehicle occupant restraint system for a seat of a vehicle, the system including: a first arm portion mountable on a first side of the seat, the first arm having an engaging portion; and a second arm portion mountable on a second side of the seat, the second arm having an engaging portion, the engaging portion of the first arm portion being engageable with the engaging portion of the second arm portion to restrain an occupant on the seat, wherein at least one of the first arm portion and the second arm portion is adjustable relative to the seat.

Preferably, only the first arm portion is moveable relative to the seat while the second arm portion is stationary relative to the seat. In other embodiments, both the first and second arm portions are moveable relative to the seat.

The engaging portion of the first arm portion may include a buckle portion and the engaging portion of the second arm portion includes a tongue portion that is engageable with the buckle portion. Alternatively, the engaging portion of the second arm portion may include a buckle portion and the engaging portion of the first arm portion includes a tongue portion that is engageable with the buckle portion.

The at least one of the first arm portion and the second arm portion may be adjustable relative to the seat between a stowed position and an operative position in which the engaging portion of the at least one arm portion is in a forwardly-presented position relative to the seat for ready access by occupant. Preferably, in the stowed position, the at least one of the first arm portion and the second arm portion is substantially in line with a portion of the seat so as to not obstruct the occupant's entry into, or exit from, the seat.

The at least one first arm portion and the second arm portion is preferably pivotable relative to the seat. The at least one first arm portion and the second arm portion may be pivotable in a range of up to about 90°, preferably up to about 60°, or further preferably up to about 45°. In other embodiments, the at least one first arm portion and the second arm portion is slidable relative to the seat.

Preferably, at least one the first and second arm portions is an elongate body that is able to remain substantially upright when mounted to the respective side of the seat. Both of the first and second arm portion may be an elongate body that is able to remain substantially upright when mounted to the respective side of the seat.

According to another aspect of the present invention, there is provided a vehicle occupant restraint system for a seat of a vehicle, the system including: a first arm portion mountable on a first side of the seat, the first arm being an elongate body that is able to remain substantially upright when mounted to the first side of the seat, the first arm portion having an engaging portion; and a second arm portion mountable on a second side of the seat, the second arm having an engaging portion that is engageable with the engaging portion of the first arm portion to restrain an occupant on the seat.

The second arm portion may be an elongate body that is able to remain substantially upright when mounted to the second side of the seat.

When not in use, the substantially upright arm portion does not obstruct entry into or exit from the seat.

The elongate body is preferably a substantially rigid body. For example, the elongate body may be made from a rubber material. The elongate body may flex partially around the occupant when the operative portions of the first and second arm portions engage each other.

Preferably, the engaging portion of the first and second arm portions are, when located on the seat and prior to engagement, are presented forwardly from the seat without obstructing the occupant's entry into or exit from the seat.

According to a further aspect of the present invention, there is provided a vehicle occupant restraint system for a seat of a vehicle, the system including: a first engaging portion locatable on a first side of the seat; and a second engaging portion locatable on a second side of the seat, the first engaging portion being engageable with the first engaging portion to restrain an occupant on the seat; wherein the first engaging portion and the second engaging portion, when located on the seat and prior to engagement, are presented forwardly from the seat without obstructing the occupant's entry into or exit from the seat.

Preferably, the first and second engaging portions, when located on the seat and prior to engagement, are forward of the occupant's hip. Alternatively, the first and second engaging portions, when located on the sear and prior to engagement, may be forward of the occupant's waist or shoulders. The first and second engaging portions may be forward of the occupant at the same or different locations on respective sides of the seat. For example, the first and second engaging portions may both be located forward of the occupant's hip or forward of the occupant's shoulders. In another example, the first engaging portion may be located forward of the occupant's hip while the second engaging portion is located forward of the occupant's shoulder.

The first and second engaging portions, when located on the seat and prior to engagement, are at least 100 mm from a seat surface. The first and second engaging portions are at least 200 mm from the seat surface. The seat surface may be a seat base or a seat backrest.

The first and second arm portions may have a length that, when they are mounted to the seat, the operative portion of the respective arm portion is, or is adjustable to be, at or near a side of a waist portion of the occupant. The first and second arm portions have a length of up to about 500 mm, preferably up to about 400 mm, further preferably up to about 380 mm.

The engaging portion of at least one of the first and second arm portions may preferably be retractable relative to the respective arm portion. The engaging portion of only one of the respective arm portions may be retractable, while the other engaging portion is fixed relative to its respective arm portion. In other examples, the engaging portion of both arm portions are retractable relative to their respective arm portions.

According to a further aspect of the present invention, there is provided a vehicle occupant restraint system for a seat of a vehicle, the system including: a first arm portion mountable on a first side of the seat, the first arm having an engaging portion; and a second arm portion mountable on a second side of the seat, the second arm having an engaging portion that is engageable with the engaging portion of the first arm portion to restrain an occupant on the seat, wherein at least one of the engaging portion of the first arm portion and the engaging portion of the second arm portion is retractable relative to the respective arm portion.

The at least engaging portion of the first or second one arm portion that is retractable is preferably coupled to the respective arm portion by a webbing. As an example, the webbing may be a sash. The respective arm portion from which the operative portion is retractable preferably has a chamber from which the webbing is retractably drawable. A roll of the webbing is preferably stored in the chamber with a free end of the webbing being coupled to the operative portion that is locatable at a mouth portion of the respective arm portion.

At least one of the arm portions may have one or more apertures for egress of any water, fluid, or debris from the respective the arm portion.

According to yet another aspect of the present invention, there is provided a vehicle occupant restraint system for a seat of a vehicle, the system including: a first arm portion mountable on a first side of the seat, the first arm having an engaging portion; and a second arm portion mountable on a second side of the seat, the second arm having an engaging portion that is engageable with the engaging portion of the first arm portion to restrain an occupant on the seat, wherein at least one of the arm portions has one or more apertures for egress of any water, fluid, or debris from the respective the arm portion.

The at least one arm portions is preferably an elongate body having a mouth portion at one end where the engaging portion is located or is locatable. The one or more apertures being located may be located on the elongate body away from the mouth portion.

The first arm portion and the second arm portion of the vehicle occupant restraint system of any of the previously described aspects are part of a lap belt system. For example, the first arm portion is locatable on one side of the seat base and the second arm portion is locatable on an opposite side of the seat base.

In other embodiments, the first arm portion and the second arm portion may be part of a multi-point seatbelt system. For example, the first and second arm portions may be part of a 3-point system, a 4-point system, a 5-point system, a 6-point system, or a 7-point system.

The system preferably further includes one or more additional arm portions, each additional arm portion having an engaging portion that is engageable with the engaging portion of the first or second arm portion to restrain the occupant on the seat. The first arm portion, the second arm portion, and the additional arm portion(s) form part of the multi-point seatbelt system. A respective one of the additional arm portions has one or more features of the first and second arm portions of the vehicle occupant restraint system previously described above. As an example, a respective one of the additional arm portions may be adjustable relative to the seat. As another example, a respective one of the additional arm portions may be an elongate body that is able to remain substantially upright when mounted to the seat. As a further example, the engaging portion of a respective one of the additional arm portions may be presented forwardly from the seat without obstructing the occupant's entry into or exit from the seat. As yet another example, the engaging portion of a respective one of the additional arm portions may be retractable relative to the respective arm portion. As yet a further example, a respective one of the additional arm portions has one or more apertures for egress of any water, fluid, or debris from the respective the arm portion.

According to yet a further aspect of the present invention, there is provided a seat including the vehicle occupant restraint system of any one or more of the aspects described previously above.

BRIEF DESCRIPTION OF THE DRAWINGS

The invention will now be described, by way of non-limiting example only, with reference to the accompanying drawings, in which.

DETAILED DESCRIPTION

Figure 1A:
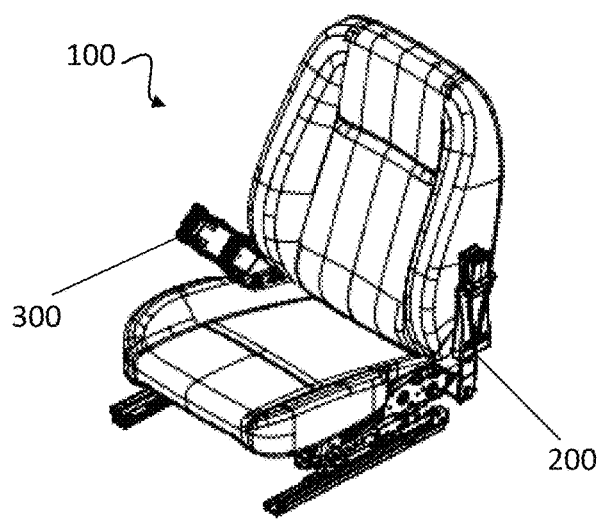
FIGS. 1A and 1B show a perspective view of a seat according to an embodiment of the present invention with an arm portion of a vehicle according to an embodiment of the present invention.
Figure 1B:
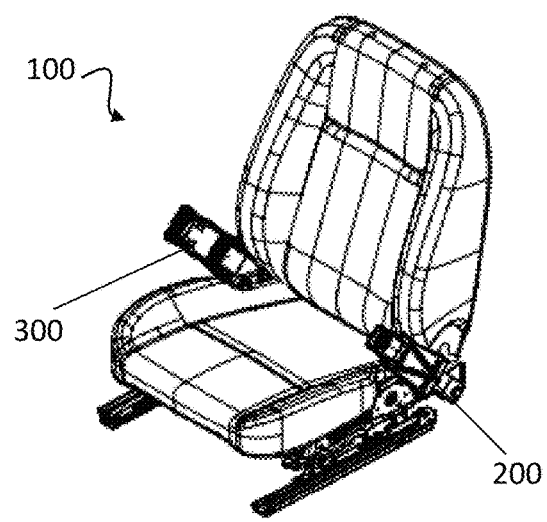

FIGS. 1A and 1B show a seat 100 with a vehicle occupant restraint system according to an embodiment of the present invention. The restraint system includes a first arm portion 200 that is mounted on a first side of the seat, and a second arm portion 300 that is mounted on a second side of the seat. Each of the first and second arm portions 200, 300 have an operative portion (or an engaging portion). The operative portion of the first arm portion 200 is engageable with the operative portion for the second arm portion 300 to restrain an occupant on the seat. The operative portions of the seat may include a buckle portion and a tongue portion for example. The first and second arm portions 200, 300 form part of a lap belt system; when the operative portions are in engagement with each other, webbings (or straps) of the seatbelt system run across a lap of the occupant to restrain the occupant in the seat. In other examples, the first and second arm portions may be part of a multi-point seatbelt system (e.g. one of a three-point system, a four-point system, a five-point system, a six-point system, a seven-point system, etc.).

The first arm portion 200 is adjustable relative to the seat 100, while the second arm 300 is stationary relative to the seat 100. In other examples, both the first arm portion and the second arm portion of the vehicle occupant restraint system are adjustable. In yet further examples, the second arm portion is adjustable relative to the seat while the first arm portion is stationary relative to the seat.

The first arm 200 is adjustable relative to the seat 100 between a stowed position (shown in FIG. 1A) and an operative position (shown in FIG. 1B). In the example shown in FIGS. 1A and 1B, the first arm portion 200 is pivotable between the stowed position and the operative position. A pivot axis about which the first arm 200 is pivotable is located at a lower portion of the backrest of the seat. In other example, the pivot axis about which the first arm is pivotable may be pivotable may be below the backrest of the seat, may be at a rear portion of the base of the seat, or may be rearward of the base. In other examples, the first arm portion may be slidable relative to the seat. As an example, the first arm portion may telescopic and such that the arm portion may be pulled forwardly from the seat to the operative position and pushed rearwardly towards the seat to the stowed position.

When the first arm portion 200 is in the stowed position, with reference to FIG. 1A, the first arm portion 200 is substantially in line with a portion of the seat so as to not obstruct the occupant's entry into, or exit from, the seat 100. The first arm portion when in the stowed position would not be in the way of the occupant. In the example shown in FIG. 1A, the first arm portion 200 when in the stowed position is positioned rearwardly such that first arm portion 200 is in line with the backrest of the seat. In other examples, the first arm portion when in the stowed position is positioned downwardly such that the first arm portion is in line with a base of the seat. In yet further other examples, the first arm portion may have two stowed positions—a first stowed position in which it is in line with the backrest of the seat and a second stowed position in which it is in line with the base of the seat.

When the first arm 200 portion is in the operative position, with reference to FIG. 1B, the first arm portion 200 is in a forwardly-presented position relative to the seat for ready access by occupant. In the forwardly-presented position, the operative portion of the first arm portion 200 is angled forwardly and upwardly from the seat portion. In this position, the operative portion of the first arm portion 200 is presented forwardly from the seat without obstructing the occupant's entry into or exit from the seat. In the example shown in FIG. 1B, in the forwardly-presented position, the first arm portion 200 is at an angle of about 45° to the base of the seat. In other examples, the first arm portion may be at an angle of up to 80°, up to 70°, up to 60°, or up to 30°. The operative portion of the first arm portion 200 when in the operative position is about 100 mm, preferably about 200 mm, from the seat base and/or from the seat backrest.

As mentioned previously, the second arm portion 300, in the example shown in FIGS. 1A and 1B, is stationary relative to the seat. The second arm portion 300 is in particular, in a forwardly-presented position. In this position, the operative portion of the second arm portion 300 is presented forwardly from the seat without obstructing the occupant's entry into or exit from the seat. In the forwardly-presented position, the second arm portion 300 is at an angle of about 45° to the base of the seat. In other examples, the second arm portion may be at an angle of up to 80°, up to 70°, up to 60°, or up to 30°. The operative portion of the second arm portion 300 when in the operative position is about 100 mm, preferably about 200 mm, from the seat base and/or from the seat backrest. The first arm portion 200, when in its forwardly-presented position, is substantially parallel with the second arm portion 300. Both of the first and second arm portions, in their forwardly-presented positions extend from the seat in substantially the same direction.

Figure 2A:
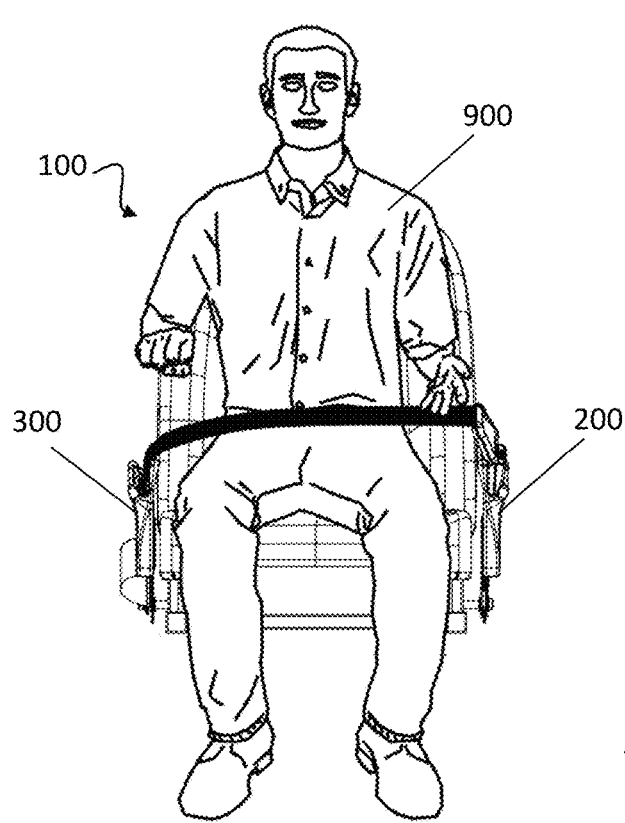
FIGS. 2A and 2B show views of an occupant restrained on the seat shown in FIGS. 1A and 1B.
Figure 2B:
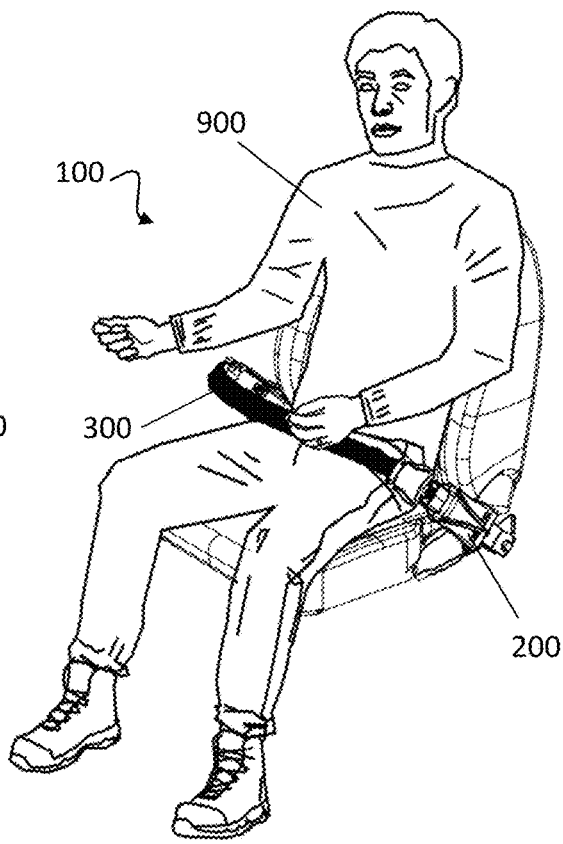

With reference to FIGS. 2A and 2B, when an occupant 900 sits on the seat 100, the occupant 900 manually adjusts the first arm portion 200 from the stowed position to the operative position. In other examples, the first arm portion 200 may automatically adjusted from the stowed position to the operative position when the occupant sits on the chair. For example, there may be sensors (e.g. pressure sensors) on the chair to detect when the occupant is sitting on the chair, which causes the first arm portion to be adjusted to the operative position. When the first arm portion 200 is in the stowed position, the occupant may enter or leave the seat from the side on which the first arm position 200 is provided without being blocked by the first arm portion 200. When the occupant enters the seat 100 with the first arm portion 200 in the stowed position, the occupant adjusts the first arm portion 200 to the operative position and engages the operative portion of the first arm portion 200 with the operative portion of the second arm portion 300. Thereby, the engagement of the operative portions of the first and second arm portions would restrain the occupant in the seat 100. When the occupant 900 desires to leave the seat 100, the occupant 900 unfastens or disengages the operative portions of the first and second arm portions 200, 300 from each other and adjusts the first arm portion 200 to the stowed position. The occupant 900 may then leave the seat 100. In other examples, the first arm portion may be biased to the stowed position such that when the occupant 900 unfastens the operative portions of the first and second arm portions 200, 300, the first arm portion will automatically return to the stowed position.

Figure 3A:
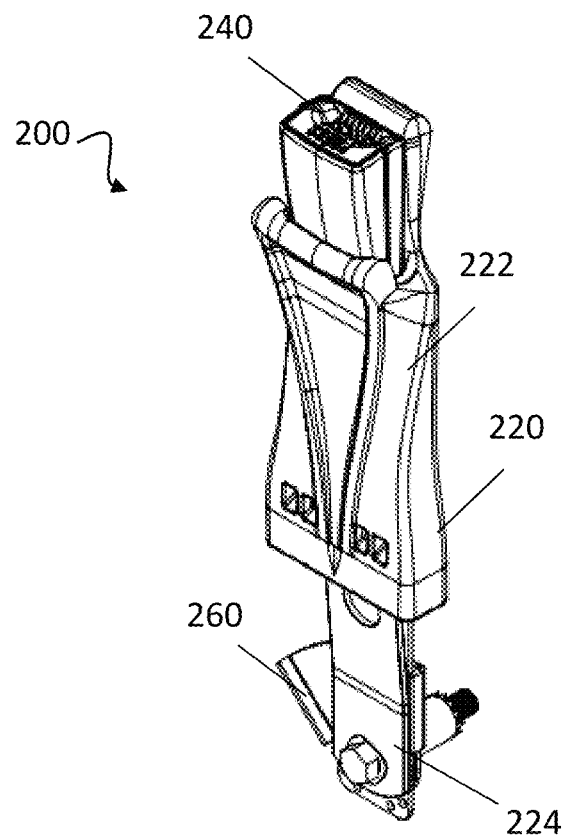
FIGS. 3A and 3B show views of a first arm portion for the seat shown in FIGS. 1A and 1B.
Figure 3B:
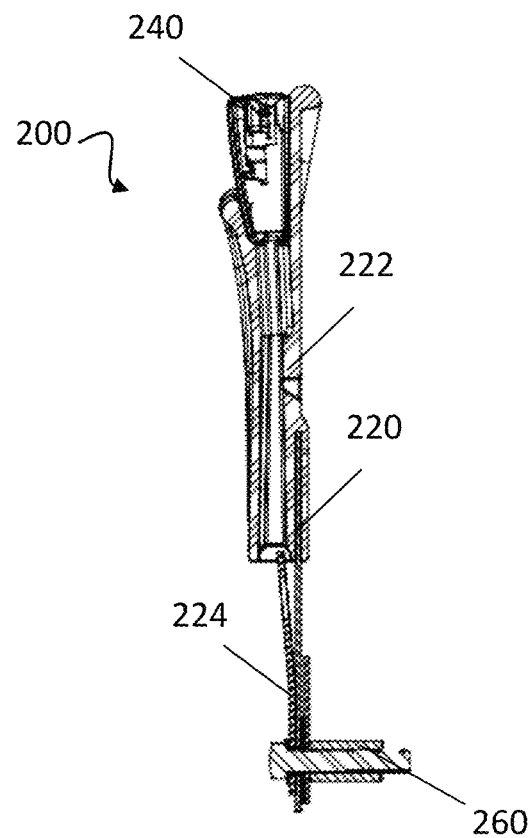

FIGS. 3A and 3B show the first arm portion 200 according to an embodiment of the present invention. The first arm portion 200 includes an elongate body 220, an operative portion 240, and a bracket portion 260. In this example, the operative portion 240 is a buckle portion in which a tongue portion is insertable. The elongate body 220 is able to remain substantially upright when mounted to the respective side of the seat. When the arm portion 200 is in the forwardly-presented position relative to the seat, the elongate body 220 remains substantially upright relative to the seat 100. The first arm portion 200 has a length of up to about 500 mm, preferably up to about 400 mm, further preferably up to about 380 mm.

The elongate body 220 includes a sleeve portion 222 and an anchor portion 224 that is pivotably mounted to the bracket 260. The bracket 260 is securable to the seat. The sleeve portion 222 has at one end thereof a mouth portion at which the operative portion (e.g. the buckle portion) 240 is provided. The anchor portion 224 extends from an opposite end of the sleeve portion 222. A securing portion or webbing for securing the operative portion 240 to the anchor portion 224 runs through the sleeve portion 222. The operative portion 240 may have some adjustability relative to the sleeve portion. In other examples, the operative portion 240 may be fixed relative to the sleeve portion. The sleeve portion has a tongue portion extending from the mouth portion against which the operative portion is restable. The tongue portion forms a rear wall of the arm portion and provides some padding between the operative portion and the occupant on the seat for comfort. The tongue portion in particular rests above a hip point or on a side of a waist of the occupant on the seat.

Figure 4:
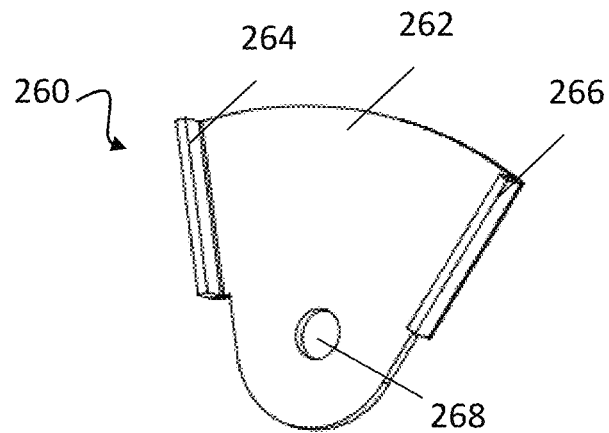
FIG. 4 shows a bracket of the first arm portion shown in FIGS. 3A and 3B.

With reference to FIG. 4, the bracket portion 260 has a base portion 262, a first stop portion 264 on a first side of the base portion, and a second stop portion 266 on a second side of the base portion. The base portion 262 has a substantially triangular profile. The base portion provides a surface against which the anchor portion of the arm portion is slidable. The first and second stop portions 264, 266 are provided on sides of the triangular-shaped base portion 262. A mounting feature 268 is provided near an apex of the base portion from where the first and second stop portions 264, 266 are provided. The mounting feature 268 is for engaging the anchor portion of the arm portion and defines a pivot axis about which the arm portion would be pivotable. In this example, the mounting feature 268 is an aperture. The first and second stop portions define a range of adjustability of the arm portion that is mounted to the bracket portion 260. When the anchor portion contacts the first stop portion 264, the arm portion would be in the operative position, and when the anchor contacts the second stop portion 266, the arm portion would be in the stowed position. There is an angle of about 45° between the first and second stop portions 264, 266. In other examples, the angle may be up to 90°, up to 80°, up to 70°, up to 60°, or up to 30°.

Figure 5A:
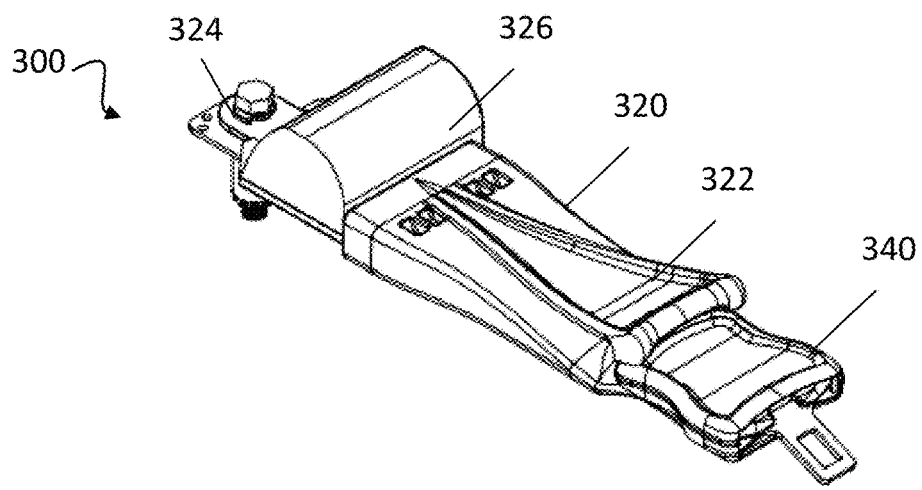
FIGS. 5A to 5C show views of a second arm portion for the seat shown in FIGS. 1A and 1B.
Figure 5B:
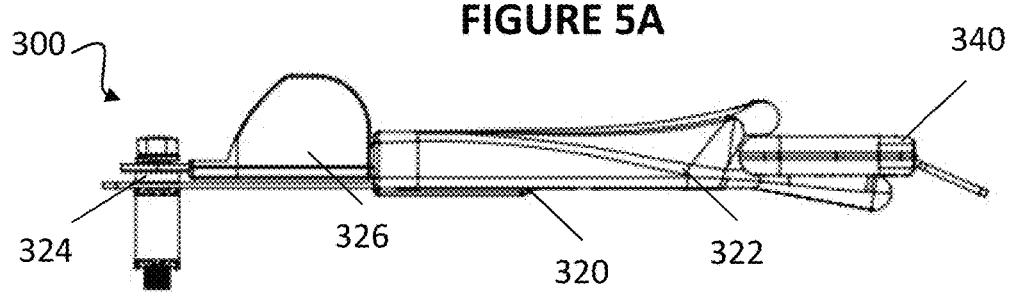
Figure 5C:
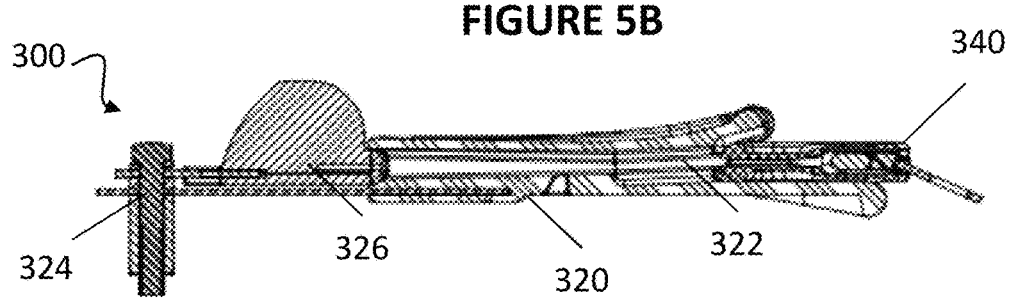

FIGS. 5A to 5C shows the second arm portion 300 according to an embodiment of the present invention. The second arm portion 300 includes an elongate body 320 and an operative portion 340. In this example, the operative portion 340 is a tongue portion which is insertable into a buckle portion. Like the first arm portion previously described, the elongate body 320 is able to remain substantially upright when mounted to the respective side of the seat. When the arm portion 300 is in the forwardly-presented position relative to the seat, the elongate body 320 remains substantially upright relative to the seat 100. Unlike the first arm portion, the second arm portion 300 would not be adjustable relative to the seat between the stowed position and the operative position. The first arm portion 300 has a length of up to about 500 mm, preferably up to about 400 mm, further preferably up to about 380 mm.

The elongate body 320 includes a sleeve portion 322, an anchor portion 324, and a chamber (or webbing housing) 326. The anchor portion 324 is securable to the seat. The sleeve portion 322 has at one end thereof a mouth portion at which the operative portion (e.g. the tongue portion) 340 is provided. The anchor portion 324 extends from an opposite end of the sleeve portion 322. The chamber (or webbing housing) 326 is located on the anchor portion 324 at or near an end opposite the mouth portion of the sleeve portion. A webbing from a roll of webbing stored within the chamber 326 runs through the sleeve portion 322 to the operative portion 340. The operative portion 340 is retractable relative to the elongate body 320 of the arm portion 300. In particular, an occupant of the seat can draw the operative portion 340 from the sleeve portion 322 of the elongate body 320 for engagement with the operative portion of the other arm portion. When the user unfastens or disengages the operative portions of the first and second arm portions, the operative portion 340 of the second arm portion 300 would retract towards the mouth portion of the sleeve portion 322. The chamber 340 has a biasing means for retracting the webbing to the operative portion 340 to ensure that occupant is securely restrained on the seat when the operative portions of the first and second arm portions are engaged with each other and to facilitate storage of the webbing when the operative portions are unfastened or disengaged. The sleeve portion 322 has a tongue portion extending from the mouth portion. The tongue portion forms a rear wall of the arm portion and provides some padding between to the occupant on the seat for comfort. The tongue portion in particular rests above a hip point or on a side of a waist of the occupant on the seat.

Figure 6A:
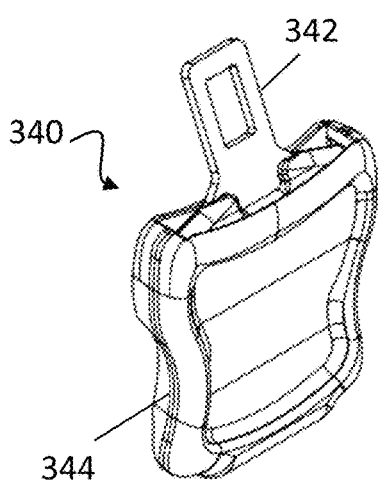
FIGS. 6A to 6C show views of an operative portion of the second arm portion shown in FIGS. 5A to 5C.
Figure 6B:
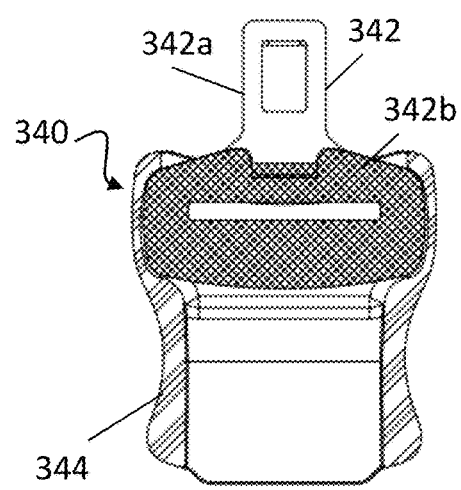
Figure 6C:
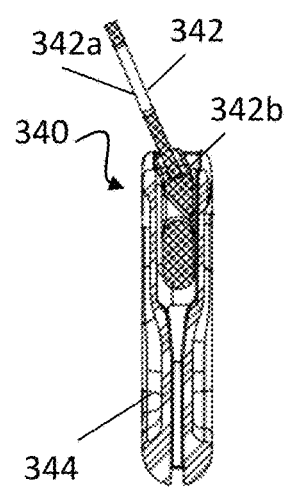

FIGS. 6A to 6C show the operative portion 340 for the second arm portion. The operative portion 340 has a tongue portion 342 and a grip portion 344. The tongue portion 342 has a buckle-engaging portion 342a that is insertable into a buckle portion and a body portion 342b from which the buckle engaging portion 342a extends. The grip portion 344 is a housing in which the tongue portion 342 is partially received. In particular, the body portion of the tongue portion is located inside the housing of the grip portion 344. The tongue portion 342 is trapped within the grip portion 344. In particular, an opening in the grip portion through which the tongue portion extends is restricts the body portion 342b from being pulled out of the opening. The grip portion 344 has trapping portions or overhang portions to prevent removal of the operative portion 340 from the grip portion. The grip portion 344 has an opening at one end at which the tongue portion 342 is provided and an opening at an opposite end through which the webbing to the tongue portion can be threaded. The grip portion 344 is ergonomically designed to be comfortably graspable by an occupant. In the example shown in FIGS. 6A to 6C, the grip portion 344 has a sidewall portions having a waist shape, or inwardly curved shape, around which the occupant's hand can be comfortably located. In addition, the grip portion 344 is sized such that the occupant may grip the grip portion with three or more fingers. The grip portion 344 has rounded portions for occupant comfort when gripping the grip portion.

Figure 7A:
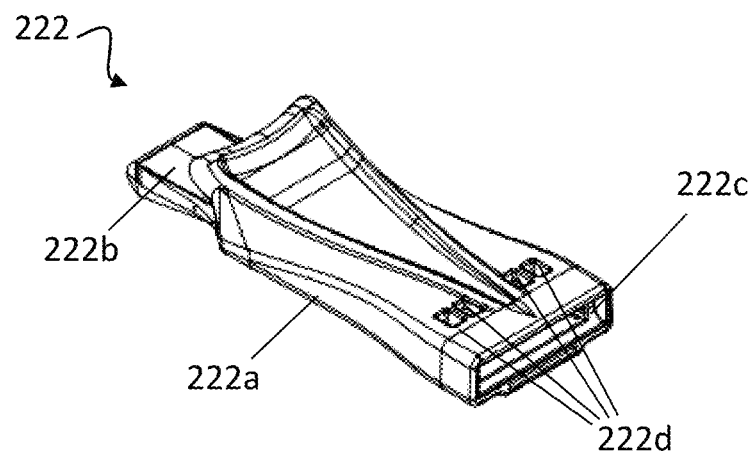
FIGS. 7A to 7C show views of an elongate body of the first arm portion shown in FIGS. 3A and 3B.
Figure 7B:
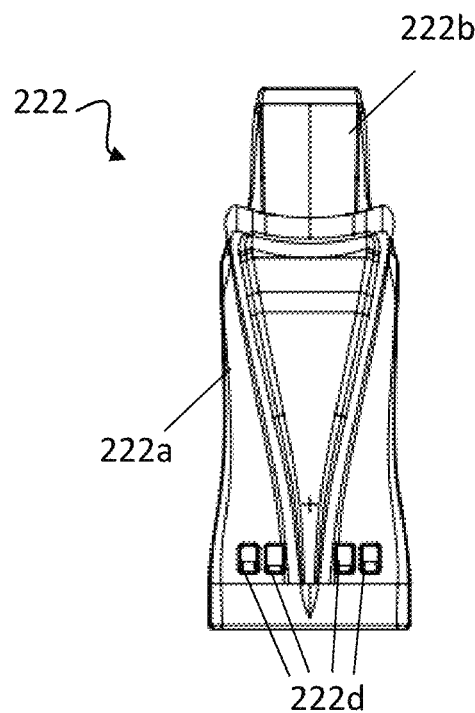
Figure 7C:
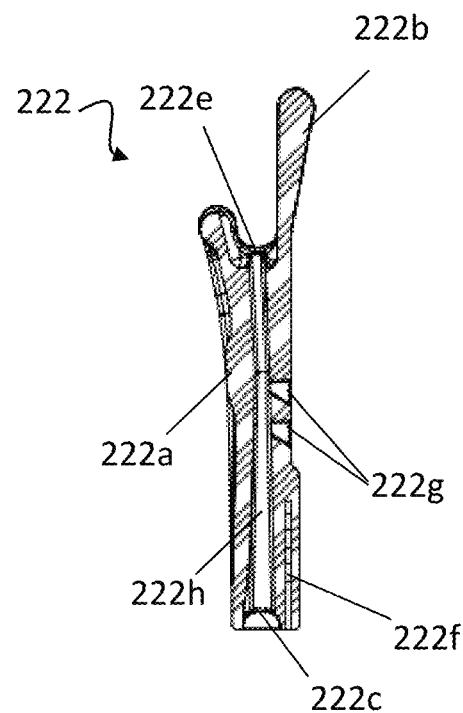

FIGS. 7A to 7C show the sleeve portion 222 of the first arm portion. The sleeve portion 222 of the first arm can also be used as the sleeve portion of the second arm. The sleeve portion 222 is made from a material that allows for the arm portion to remain substantially upright when mounted to the seat. For example, the sleeve portion 222 is made from a rubber material. The sleeve portion 222 may, in other example, be made from a plastic material. When the operative portion of the first arm portion engages the operative portion of the second arm portion, the sleeve portion can flex to wrap at least partially around the occupant on the seat. The operative portion of an arm portion is shaped to be complementarily received by the mouth portion of the respective sleeve portion of the arm portion.

The sleeve portion 222 has an elongate body portion 222a defining a housing with a channel (or passage) 222h through which a webbing or securing portion is passable. The sleeve portion has a mouth portion 222e at end of the elongate body portion 222a and a rear opening 222c at an opposite end. The operative portion for the arm portion is receivable at the mouth portion 222e. The webbing or securing portion that is attached to the operative portion is passed through the elongate body portion 222a via the rear opening 222c, through the channel 222h, to the operative portion that is locatable at the mouth portion 222e. A tongue portion 222b extends from the elongate body portion 222a and forms a rear wall portion of the sleeve portion 222. An anchor portion is engageable with a slot 222f at a rear end of the sleeve portion 222. The slot 222f is dimensioned to provide a snug fit for the anchor portion that is locatable therein.

The sleeve portion includes a series of apertures 222*d* on a front face of the sleeve portion 222 and a series of apertures 222*g* on a rear face of the sleeve portion 222. The apertures are located away from the mouth portion 222*e*. In this example, the apertures 222*d* on the front face are located near the rear opening 222*c* of the sleeve portion, and the apertures 222*g* on the rear face are located at a mid-length of the sleeve portion 222. In other examples, the sleeve portion 222 may be provided with one aperture on a front face and/or on the rear face, and/or may be provided with one or more apertures on a side wall portion of the sleeve. The apertures 222*d*, 222*g* allow for an egress of any water, other fluid, or debris from the respective sleeve portion 222. In use, water, other fluid or debris may become trapped within the channel 222*h* in which the webbing or securing portion is receivable. The apertures 222*d*, 222*g* allow for any water, other fluid, or debris trapped within the channel to be removed.

The embodiments of the invention previously described relate to a lap belt system with the first arm portions being located at one side of the seat base and the second arm portion being located at an opposite side of the seat base. In other examples, the first arm portion and the second arm portion may be part of a multi-point seatbelt system. For example, the first and second arm portions may be part of a 3-point system, a 4-point system, a 5-point system, a 6-point system, or a 7-point system.

In a 3-point system, the first arm portion may be located at or near the seat base, while the second arm portion may be located at or near an upper region of the seat backrest (i.e. the first arm portion is near the occupant's hip/waist, while the second arm portion is near a shoulder region of the occupant). In a 4-point, 5-point, 6-point, or 7-point system, the first and second arm portions are positioned on opposite sides of the seat base and the system includes one or more additional arm portions, each additional arm portion having an engaging portion that is engageable with the engaging portion of the first or second arm portion to restrain the occupant on the seat. The additional arm portions may include a crotch arm portion that is locatable between the legs of the occupant, an arm portion locatable on or near the seat base near the hip/waist of the occupant, and an arm portion locatable on or near the seat backrest near the shoulder of the occupant.

The additional arm portions has one or more features of the first and second arm portions. As an example, a respective one of the additional arm portions may be adjustable relative to the seat. As another example, a respective one of the additional arm portions may be an elongate body that is able to remain substantially upright when mounted to the seat. As a further example, the engaging portion of a respective one of the additional arm portions may be presented forwardly from the seat without obstructing the occupant's entry into or exit from the seat. As yet another example, the engaging portion of a respective one of the additional arm portions may be retractable relative to the respective arm portion. As yet a further example, a respective one of the additional arm portions has one or more apertures for egress of any water, fluid, or debris from the respective the arm portion.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

Throughout this specification and the claims which follow, unless the context requires otherwise, the word 'comprise', and variations such as 'comprises' and 'comprising', will be understood to imply the inclusion of a stated integer or step or group of integers or steps but not the exclusion of any other integer or step or group of integers or steps.

We claim:

1. A vehicle occupant restraint system for a seat of a vehicle, the system including:
   a first arm portion mountable on a first side of the seat, the first arm portion having an engaging portion; and
   a second arm portion mountable on a second side of the seat, the second arm portion having an engaging portion that is engageable with the engaging portion of the first arm portion to restrain an occupant on the seat,
   wherein at least one of the engaging portion of the first arm portion and the engaging portion of the second arm portion is retractable relative to the respective arm portion.

2. The system of claim 1, wherein the at least one of the engaging portion of the first or second arm portion that is retractable is coupled to the respective arm portion by a webbing, and the respective arm portion has a chamber from which the webbing is retractably withdrawable.

3. The system of claim 1,
   wherein at least one of the arm portions has one or more apertures for egress of any water, fluid, or debris from the respective the arm portion.

4. The system of claim 3, wherein the at least one of the arm portions includes an elongate body having a mouth portion at one end where the engaging portion is located, the one or more apertures being located on the elongate body away from the mouth portion.

5. The system of claim 1, wherein the first arm portion and the second arm portion are part of a lap belt system, with the first arm portion being locatable on one side of a base of the seat and the second arm portion being locatable on an opposite side of the base of the seat.

6. The system of claim 1, wherein the first arm portion and the second arm portion are part of a multi-point seatbelt system.

7. A vehicle occupant restraint system for a seat of a vehicle, the system including:
   a first arm portion mountable on a first side of the seat, the first arm portion having an engaging portion; and
   a second arm portion mountable on a second side of the seat, the second arm portion having an engaging portion, the engaging portion of the first arm portion being engageable with the engaging portion of the second arm portion to restrain an occupant on the seat,
   wherein at least one of the first arm portion and the second arm portion is adjustable relative to the seat,
   wherein the first arm portion and the second arm portion are part of a multi-point seatbelt system; and
   further including one or more additional arm portions, each additional arm portion having an engaging portion that is engageable with the engaging portion of the first or second arm portion to restrain the occupant on the seat, and wherein at least one of:
- a respective one of the additional arm portions is adjustable relative to the seat;
- a respective one of the additional arm portions is an elongate body that is able to remain substantially upright when mounted to the seat;
- the engaging portion of a respective one of the additional arm portions is presented forwardly from the seat without obstructing the occupant's entry into or exit from the seat;
- the engaging portion of a respective one of the additional arm portions is retractable relative to the respective arm portion; and
- a respective one of the additional arm portions has one or more apertures for egress of any water, fluid, or debris from the respective the arm portion.

8. The system of claim 7, wherein the at least one of the first arm portion and the second arm portion is adjustable relative to the seat between a stowed position and an operative position in which the engaging portion of the at least one arm portion is in a forwardly-presented position relative to the seat for ready access by occupant.

9. The system of claim 8, wherein, in the stowed position, the at least one of the first arm portion and the second arm portion is substantially in line with a portion of the seat so as to not obstruct the occupant's entry into, or exit from, the seat.

10. The system of claim 7, wherein the at least one of the first arm portion and the second arm portion is pivotable relative to the seat.

11. The system of claim 10, wherein the at least one of the first arm portion and the second arm portion is pivotable in a range of up to about 90°, up to about 60°, or up to about 45°.

* * * * *